（12）United States Patent
Kageme et al.

(10) Patent No.: US 10,613,210 B2
(45) Date of Patent: Apr. 7, 2020

(54) RADAR APPARATUS

(71) Applicant: Mitsubishi Electric Corporation, Tokyo (JP)

(72) Inventors: Satoshi Kageme, Tokyo (JP); Nobuhiro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 295 days.

(21) Appl. No.: 15/525,679

(22) PCT Filed: Dec. 15, 2014

(86) PCT No.: PCT/JP2014/083150
§ 371 (c)(1),
(2) Date: May 10, 2017

(87) PCT Pub. No.: WO2016/098163
PCT Pub. Date: Jun. 23, 2016

(65) Prior Publication Data
US 2017/0322300 A1 Nov. 9, 2017

(51) Int. Cl.
*G01S 13/58* (2006.01)
*G01S 13/42* (2006.01)
(Continued)

(52) U.S. Cl.
CPC ............ *G01S 13/582* (2013.01); *G01S 7/285* (2013.01); *G01S 13/42* (2013.01); *G01S 13/72* (2013.01); *G01S 2013/0263* (2013.01)

(58) Field of Classification Search
CPC .................................. G01S 13/582; G01S 7/285
See application file for complete search history.

(56) References Cited

U.S. PATENT DOCUMENTS 3,945,007 A * 3/1976 Radford ................ G01S 13/428
342/52
4,652,879 A * 3/1987 Rudish ................... G01S 7/021
342/371
(Continued)

FOREIGN PATENT DOCUMENTS

GB 1319002 A 5/1973
JP H03-259772 A 11/1991
(Continued)

OTHER PUBLICATIONS

International Search Report issued in PCT/JP2014/083150; dated Jan. 27, 2015.
(Continued)

*Primary Examiner* — Marcus E Windrich
(74) *Attorney, Agent, or Firm* — Studebaker & Brackett PC

(57) ABSTRACT

A configuration is provided with: a local oscillator 3 which generates M local oscillation signals $L_m(t)$ whose frequencies differ from one another by an integral multiple of an angular frequency ω; receiver devices 4-m each converting the frequency of a received signal $Rx_m(t)$ of one antenna element 2-m using one local oscillation signal $L_m(t)$ generated by the local oscillator 3, thereby generating a received video signal $V_m(t)$ having an antenna element number m; an adder 5 which adds the received video signals $V_1(t)$ to $V_M(t)$ generated by the receiver devices 4-1 to 4-M, and outputs a received video signal $V_{sum}(t)$ after addition; and an A/D converter 6 which A/D-converts the received video signal $V_{sum}(t)$ outputted from the adder 5, thereby to generate a received video signal V(n) which is a digital signal.

7 Claims, 13 Drawing Sheets

(51) Int. Cl.
*G01S 13/72* (2006.01)
*G01S 7/285* (2006.01)
*G01S 13/02* (2006.01)

(56) References Cited

U.S. PATENT DOCUMENTS

| | | | | |
|---|---|---|---|---|
| 5,103,233 | A * | 4/1992 | Gallagher | G01S 13/22 |
| | | | | 342/408 |
| 2008/0079629 | A1 * | 4/2008 | Oka | G01S 13/345 |
| | | | | 342/128 |
| 2010/0265123 | A1 * | 10/2010 | Lancashire | H01Q 3/36 |
| | | | | 342/175 |

FOREIGN PATENT DOCUMENTS

| | | |
|---|---|---|
| JP | H11-160414 A | 6/1999 |
| JP | 2012-524896 A | 10/2012 |

OTHER PUBLICATIONS

The Institute of Electronics, Information and Communication Engineers; "Radar Engineering Revised Edition"; Oct. 1996; pp. 288-291; 11.5.2; Printed in Japan.

The extended European search report issued by the European Patent Office dated Jul. 20, 2018, which corresponds to European Patent Application No. 14908373.5-1206 and is related to U.S. Appl. No. 15/525,679.

\* cited by examiner

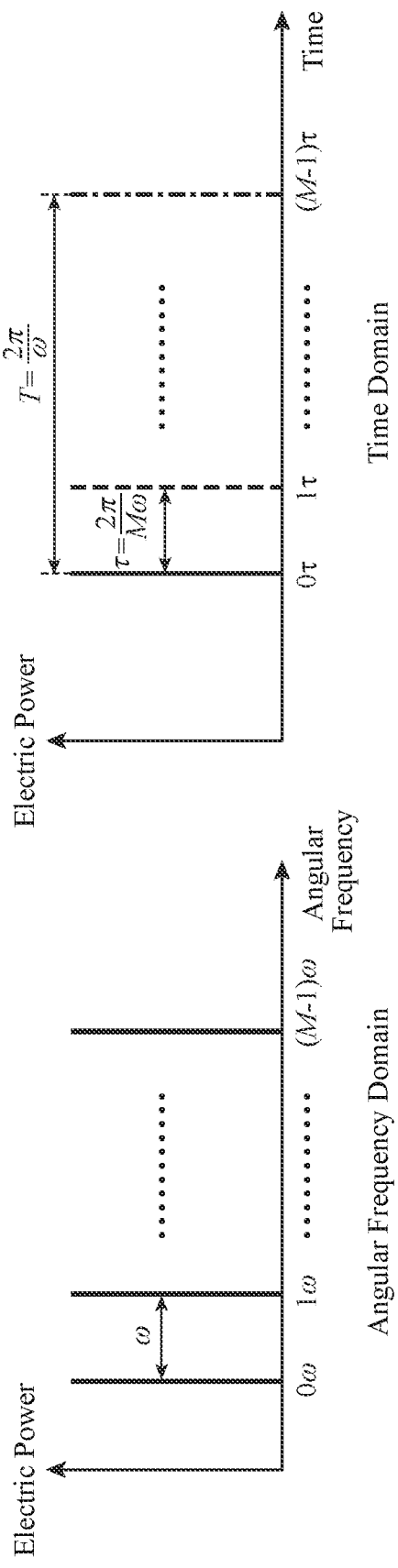

Without Weights

With Weights (Humming Window)

In the case of $T = T_{pls}$

In the case of $T = T_{pls}/2$

RADAR APPARATUS

TECHNICAL FIELD

The present invention relates to a radar apparatus that searches for a target which is an observation object.

BACKGROUND ART

Non-patent Literature 1 as listed below discloses a radar apparatus that makes it possible to search for target candidates existing in a plurality of directions by forming a plurality of antenna patterns by performing digital signal processing using a DBF (Digital beam forming) technique.

In this radar apparatus, A/D converters are disposed for a plurality of antenna elements, respectively, and convert received signals of the plurality of antenna elements into digital signals, and the plurality of digital signals are provided for a digital signal processing unit.

This digital signal processing unit performs digital signal processing on the plurality of digital signals to form a plurality of antenna patterns, thereby making it possible to search for target candidates existing in a plurality of directions.

CITATION LIST

Non-Patent Literature

Non-Patent Literature 1: The Institute of Electronics, Information and Communication Engineers, "Radar engineering revised edition", 11.5.2

SUMMARY OF INVENTION

Technical Problem

Although the conventional radar apparatus can search for target candidates existing in a plurality of directions because the conventional radar apparatus is configured as above, it is necessary to dispose an A/D converter for each of the antenna elements, and therefore the hardware scale becomes large. Further, a problem is that because the digital signal processing unit has to form a plurality of antenna patterns by performing digital signal processing, it is necessary to carry out an enormous amount of arithmetic processing until target candidates existing in a plurality of directions are searched for.

The present invention is made in order to solve the above-mentioned problems, and it is therefore an object of the present invention to provide a radar apparatus capable of searching for target candidates existing in several directions with a low amount of arithmetic processing while reducing its hardware scale.

Solution to Problem

According to the present invention, there is provided a radar apparatus which includes: a plurality of antenna elements which receive a pulse-modulated radio wave; a local oscillator which generates local oscillation signals having different frequencies that differ from one another by an integral multiple of a preset angular frequency, a period of said preset angular frequency being set as a pulse width of said pulse-modulated radio wave; a plurality of receiver devices, each receiver device converting a frequency of a received signal of one of the antenna elements using one of the local oscillation signals generated by the local oscillator; an adder which adds received signals whose frequencies are converted by the plurality of receiver devices; an analog-to-digital converter which converts a received signal obtained by the addition performed by the adder, into a digital signal, and outputs the digital signal as a received video signal; a target-candidate detector configured to detect a candidate for a target which is an observation object in accordance with signal power of the received video signal outputted from the analog-to-digital converter; and a target-candidate direction calculator configured to calculate a direction pointing to the candidate for a target from a reception time of a radio wave from which the candidate for a target is detected by the target-candidate detector.

Advantageous Effects of Invention

Because the radar apparatus according to the present invention is configured with: the plurality of antenna elements which receive a pulse-modulated radio wave; the local oscillator which generates local oscillation signals having the different frequencies; the plurality of receivers each converting the frequency of a received signal of one of the antenna elements using one of the local oscillation signals generated by the local oscillator; the adder which adds received signals whose frequencies are converted by the plurality of receivers; the analog-to-digital converter which converts a received signal obtained by the addition performed by the adder, into a digital signal, and outputs the digital signal as a received video signal; the target-candidate detector configured to detect a candidate for a target which is an observation object in accordance with the signal power of the received video signal outputted from the analog-to-digital converter; and the target-candidate direction calculator configured to calculate the direction pointing to the candidate for a target from the reception time of a radio wave from which the candidate for a target is detected by the target-candidate detector, this configuration makes it possible to search for multiple target candidates existing in several directions with a low amount of arithmetic processing and to reduce the hardware scale.

BRIEF DESCRIPTION OF DRAWINGS

FIGS. 4A and 4B are explanatory drawings showing the received signal of each antenna element 2-$m$;

DESCRIPTION OF EMBODIMENTS

Hereafter, in order to explain this invention in greater detail, the preferred embodiments of the present invention will be described with reference to the accompanying drawings. Embodiment 1.

Figure 1:
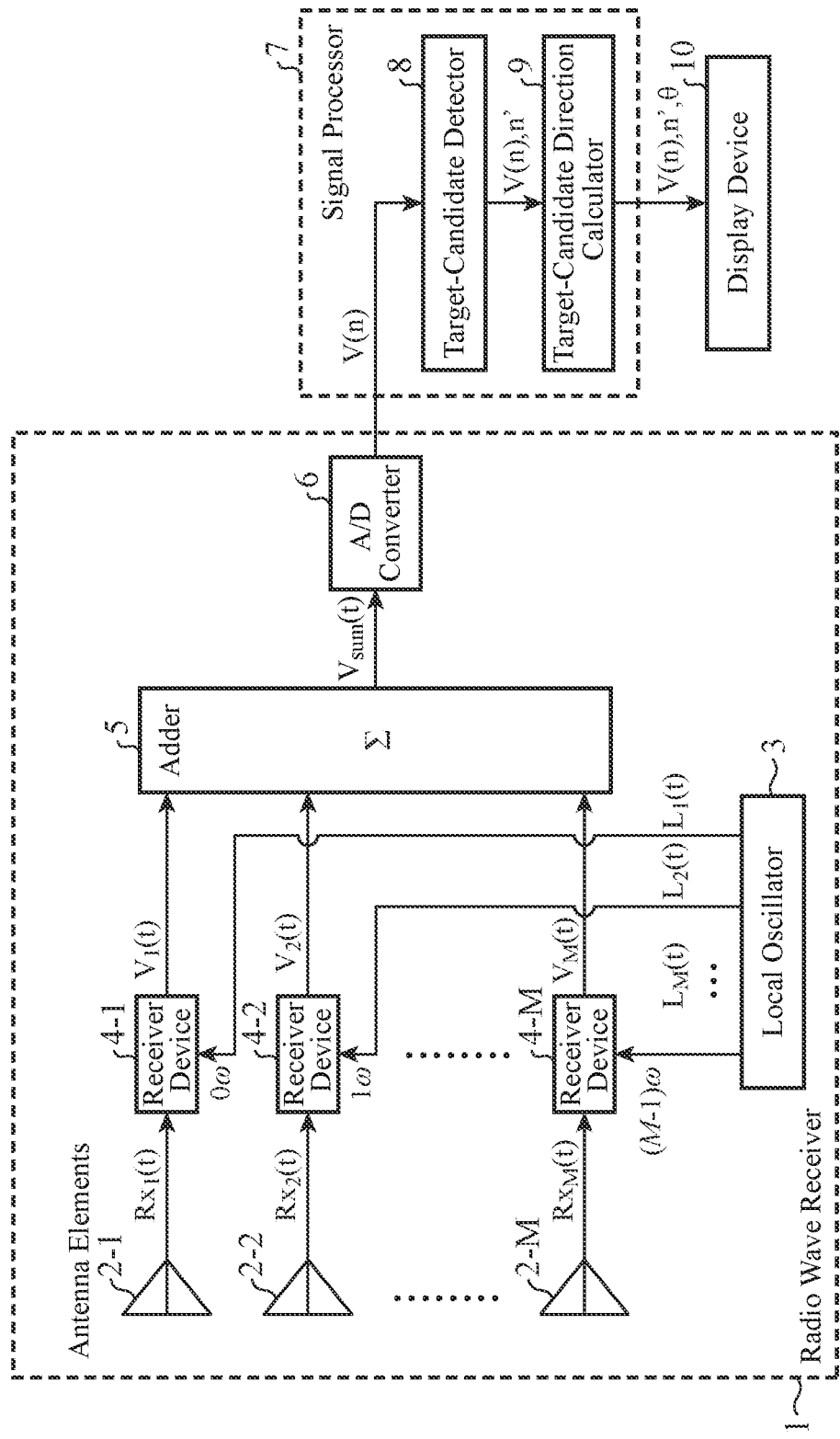
FIG. 1 is a configuration diagram showing a radar apparatus according to Embodiment 1 of the present invention.

FIG. 1 is a configuration diagram showing a radar apparatus according to Embodiment 1 of the present invention.

In the configuration shown in FIG. 1, a radio wave receiver is an antenna device that, while changing the pointing direction of an antenna pattern in each of time slots, receives a radio wave radiated by each of target candidates which are observation objects existing in a plurality of directions, or a radio wave scattered by each of target candidates, to generate a received video signal, and is comprised of M antenna elements 2-1 to 2-M, a local oscillator 3, M receiver devices 4-1 to 4-M, an adder 5 and an A/D converter (analog-to-digital converter) 6.

Each antenna element 2-m (m=1, 2, . . . , M) receives a radio wave, and outputs a received signal $Rx_m(t)$ of the radio wave to a receiver device 4-m.

The local oscillator 3 generates M local oscillation signals $L_m(t)$ whose frequencies differ from one another by an integral multiple of a preset angular frequency ω.

Each receiver device 4-m converts (downconverts) the frequency of the received signal $Rx_m(t)$ of the antenna element 2-m by using the local oscillation signal $L_m(t)$ generated by the local oscillator 3, thereby generating a received video signal $V_m(t)$ having an antenna element number m.

The adder 5 adds the received video signals $V_1(t)$ to $V_M(t)$ generated by the M receiver devices 4-1 to 4-M, and outputs a received video signal $V_{sum}(t)$ after addition.

When adding the received video signals $V_1(t)$ to $V_M(t)$ generated by the M receiver devices 4-1 to 4-M, the adder 5 can perform a window function process of applying weights to the respective M received video signals $V_1(t)$ to $V_M(t)$ and then adding the weighted received video signals, thereby reducing the side lobes of the antenna pattern.

The A/D converter 6 A/D-converts the received video signal $V_{sum}(t)$ after addition, which is outputted from the adder 5, and outputs a received video signal V(n) which is a digital signal of the received video signal $V_{sum}(t)$. n denotes a sampling number.

A signal processor 7 is comprised of a target-candidate detector 8 and a target-candidate direction calculator 9, and performs a process of searching for a target candidate existing in each of directions from the received video signal V(n) outputted by the radio wave receiver 1.

The target-candidate detector 8 of the signal processor 7 performs a process, e.g. a CFAR (Constant False Alarm Rate) process, which is based on the signal power of the received video signal V(n) outputted from the radio wave receiver 1, thereby detecting a target candidate. When detecting a target candidate, the target-candidate detector 8 outputs the sampling number n' of the time corresponding to the peak power associated with the target candidate, as information showing the reception time n' Δt of the radio wave from which the target candidate is detected, to the target-candidate direction calculator 9. Δt denotes the sampling period of the A/D converter 6.

The target-candidate direction calculator 9 of the signal processor 7 performs a process of calculating a direction θ' of the target candidate by using the sampling number n' outputted from the target-candidate detector 8.

A display device 10 consists of, for example, a liquid crystal display, and displays the received video signal V(n), the sampling number n', the direction θ' of the target candidate and so on, which are outputted from the signal processor 7, as searched results, on the screen thereof.

In the example shown in FIG. 1, it is assumed that the target-candidate detector 8 and the target-candidate direction calculator 9 which are the components of the signal processor 7 consist of pieces of hardware for exclusive use (e.g. semiconductor integrated circuits each equipped with a CPU (Central Processing Unit), one chip microcomputers or the likes), respectively. As an alternative, the signal processor 7 can consist of a computer.

Figure 2:
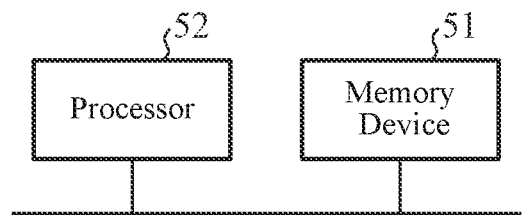
FIG. 2 is a hardware configuration diagram showing a signal processor of a radar apparatus according to any one of Embodiments 1 to 3 of the present invention.

FIG. 2 is a hardware configuration diagram in the case in which the signal processor 7 consists of a computer. In the case in which the signal processor 7 consists of a computer, it is preferable that a program in which the details of processes performed by the target-candidate detector 8 and the target-candidate direction calculator 9 are described is stored in a memory device 51 of the computer, and a processor 52, such as a CPU of the computer, executes the program stored in the memory device 51.

Next, operations will be explained.

Figure 3:
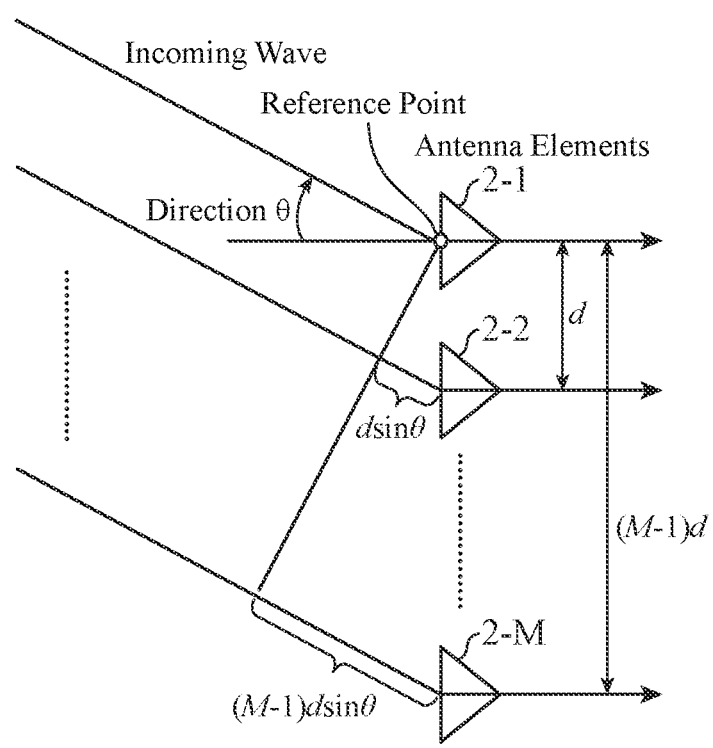
FIG. 3 is an explanatory drawing showing a relationship among the phases of received signals in antenna elements 2-1 to 2-M.

FIG. 3 is an explanatory drawing showing a relationship among the phases of received signals in the antenna elements 2-1 to 2-M.

Although an example of a uniform linear array in which the antenna elements 2-1 to 2-M are disposed at equal intervals is shown in FIG. 3, the antenna elements 2-1 to 2-M do not necessarily have to be disposed at equal intervals.

In the example shown in FIG. 3, the antenna element 2-1, among the M antenna elements 2-1 to 2-M, is disposed at a reference point, and the antenna elements 2-1 to 2-M are disposed at equal intervals of d.

In this Embodiment 1, a case in which a radio wave radiated or scattered from a target existing in a direction of θ and at a position having a relative distance of $R_0$ is incident upon the antenna elements 2-1 to 2-M will be explained.

In this case, the received signal $Rx_m(t)$ of each antenna element 2-m is shown by the following equation (1).

Further, the received signal $Rx_0(t)$ of the antenna element 2-1 disposed at the reference point is shown by the following equation (2). $Rx_0(t)=Rx_1(t)$ holds.

$$Rx_m(t) = Rx_0(t)\exp\left(-j2\pi f_0 \frac{(m-1)d}{c}\sin\theta\right) \quad (1)$$

$(0 \le t < T_{obs})$ $(m = 1, 2, \ldots, M)$ $$Rx_0(t) = A_{Rx}\exp\left(j2\pi f_0\left(t - \frac{R_0}{c}\right)\right) \quad (2)$$

$$(0 \le t < T_{obs})$$

In the equations (1) and (2), t denotes a time, $T_{obs}$ denotes the reception time of the radio wave, $f_0$ denotes the frequency of the carrier, M denotes the number of antenna elements, m denotes the antenna element number, d denotes the antenna element interval length, c denotes the speed of light, and $A_{Rx}$ denotes the amplitude of the received signal $Rx_0(t)$.

When a radio wave radiated or scattered from a target existing at a position having a relative distance of $R_0$ is incident thereupon, each antenna element 2-m (m=1, 2, ..., M) outputs a received signal $Rx_m(t)$ of the radio wave to the receiver device 4-m.

FIGS. 4A and 4B are explanatory drawings showing the received signal of each antenna element 2-m. Specifically, FIG. 4A shows an angular frequency interval between adjacent antenna elements.

The local oscillator 3 generates M local oscillation signals $L_m(t)$ whose frequencies differ from one another by an integral multiple of the preset angular frequency ω, as shown in the following equation (3).

$$\begin{aligned}L_m(t) &= A_L\exp(j2\pi f_0 t)\exp(-j(m-1)\omega t) \\ &= A_L\exp(j(2\pi f_0 - (m-1)\omega)t) \\ &= A_L\exp(j2\pi(f_0 - (m-1)\Delta f)t)\end{aligned} \quad (3)$$

$$(0 \le t < T_{obs})$$
$$(m = 1, 2, \ldots, M)$$

$$\omega = \frac{2\pi}{T} = 2\pi\Delta f \quad (4)$$

In the equations (3) and (4), $A_L$ denotes the amplitude of each local oscillation signal $L_m(t)$, T denotes a time period during which the phase of the angular frequency ω goes around once, and $\Delta f$ denotes the frequency interval between adjacent antenna elements.

When the local oscillator 3 generates the M local oscillation signals $L_m(t)$, each receiver device 4-m (m=1, 2, ..., M) converts (downconverts) the frequency of the received signal $Rx_m(t)$ of the antenna element 2-m by using the local oscillation signal $L_m(t)$, as shown in the following equation (5), thereby generating a received video signal $V_m(t)$ having the antenna element number m.

$$\begin{aligned}V_{in}(t) &= Rx_m(t)L_m*(t) \\ &= A_V\exp\left(j2\pi f_0\left(t-\frac{R_0}{c}\right)\right) \\ &\quad \exp\left(-j2\pi f_0 \frac{(m-1)d}{c}\sin\theta\right) \\ &\quad \exp(-j2\pi(f_0-(m-1)\Delta f)t) \\ &= A_{V,m}\exp\left(j2\pi f_0\left(-\frac{R_0}{c}\right)\right) \\ &\quad \exp\left(-j2\pi f_0 \frac{(m-1)d}{c}\sin\theta\right) \\ &\quad \exp(j2\pi(m-1)\Delta f t) \\ &= A_{V,m}\exp\left(j2\pi f_0\left(-\frac{R_0}{c}\right)\right) \\ &\quad \exp\left(j2\pi\left(-f_0\frac{(m-1)d}{c}\sin\theta + (m-1)\Delta f t\right)\right)\end{aligned} \quad (5)$$

$$(0 \le t < T_{obs})$$
$$(m = 1, 2, \ldots, M)$$

In the equation (5), $A_{V,m}$ denotes the amplitude of the received video signal $V_m(t)$ having the antenna element number m, and * denotes complex conjugate.

When the M receiver devices 4-1 to 4-M generate the received video signals $V_1(t)$ to $V_M(t)$, the adder 5 adds the received video signals $V_1(t)$ to $V_M(t)$, as shown in the following equation (6), and outputs a received video signal $V_{sum}(t)$ after addition to the A/D converter 6.

$$V_{sum}(t) = \sum_{m=1}^{M} V_m(t) \quad (6)$$

$$(0 \le t < T_{obs})$$
$$(m = 1, 2, \ldots, M)$$

Although the adder 5 simply adds the received video signals $V_1(t)$ to $V_M(t)$ of the M receiver devices 4-1 to 4-M in this example, the adder can alternatively perform a window function process of implementing a weighted addition of the received video signals $V_1(t)$ to $V_M(t)$ by using a weight $w_m$ applied to each antenna element 2-m, as shown in the following equation (7), thereby reducing the side lobes of the antenna pattern.

$$V_{sum}(t) = \sum_{m=1}^{M} (w_m V_m(t)) \quad (7)$$

$$(0 \le t < T_{obs})$$
$$(m = 1, 2, \ldots, M)$$

The weight $w_m$ assigned to each antenna element 2-m is used to set up a humming window or the like in accordance with the side-lobe levels, the signal to noise ratio, or the like.

Figure 5A:
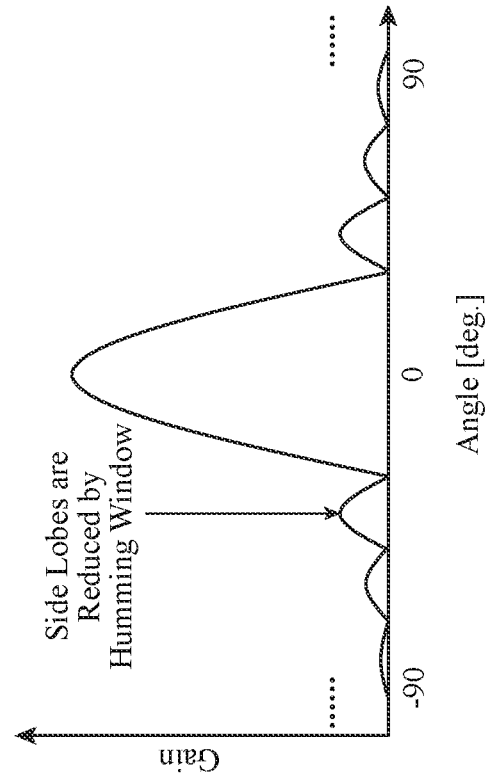
FIGS. 5A and 5B are explanatory drawings showing a window function process performed by an adder 5.
Figure 5B:
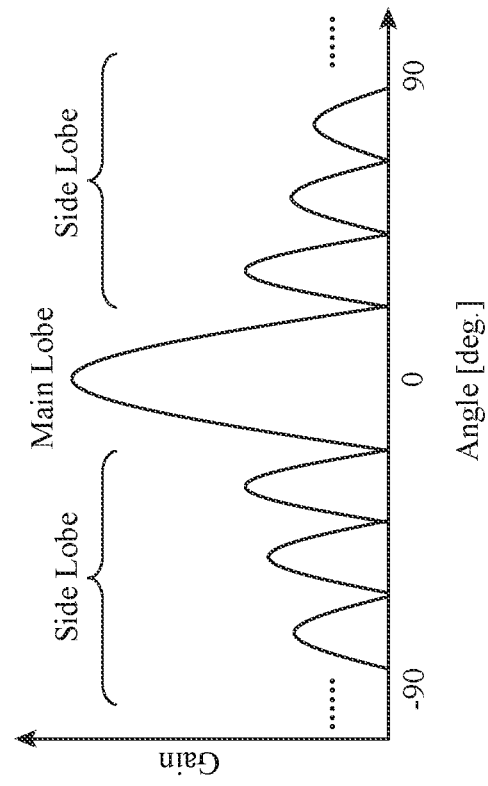

FIGS. 5A and 5B are explanatory drawings showing the window function process performed by the adder 5.

When the window function process using the weight $w_m$ applied to each antenna element 2-m is not performed, large side lobes occur as shown in FIG. 5A, whereas when the window function process using the weight $w_m$ is performed, the side lobes are reduced as shown in FIG. 5B.

When receiving the received video signal $V_{sum}(t)$ after addition from the adder 5, the A/D converter 6 A/D-converts the received video signal $V_{sum}(t)$, thereby generating a received video signal V(n) which is a digital signal expressed by the following equation (8).

$$V(n) == A_V\exp\left(-j2\pi f_0 \frac{R_0}{c}\right) \quad (8)$$

$$\sum_{m=1}^{M}\left(\exp\left(j2\pi\left(-f_0\frac{(m-1)d}{c}\sin\theta + (m-1)\Delta f n\Delta t\right)\right)\right)$$

$$(0 \le t < T_{obs})$$
$$(n = 1, 2, \ldots, N)$$

In the equation (8), n denotes the sampling number of the A/D converter 6, N denotes the number of sampling points during the radio wave reception time $T_{obs}$, and $\Delta t$ denotes the sampling period.

When generating the received video signal V(n), the A/D converter 6 outputs the received video signal V(n) to the signal processor 7. Before the details of processing performed by the signal processor 7 is explained, an effect produced by the radio wave receiver 1 will be explained.

The radio wave receiver 1 converts (downconverts) the frequencies of the received signals $Rx_m(t)$ of the antenna elements 2-*m* by using the M local oscillation signals $L_m(t)$ whose frequencies differ from one another by an integral multiple of the angular frequency $\omega$.

This conversion of the frequencies of the received signals $Rx_m(t)$ corresponds to an operation of performing control in such a way that the difference in phase between antenna elements changes by an integral multiple of $\omega t$, as shown in the equations (3) and (5).

Figure 6:
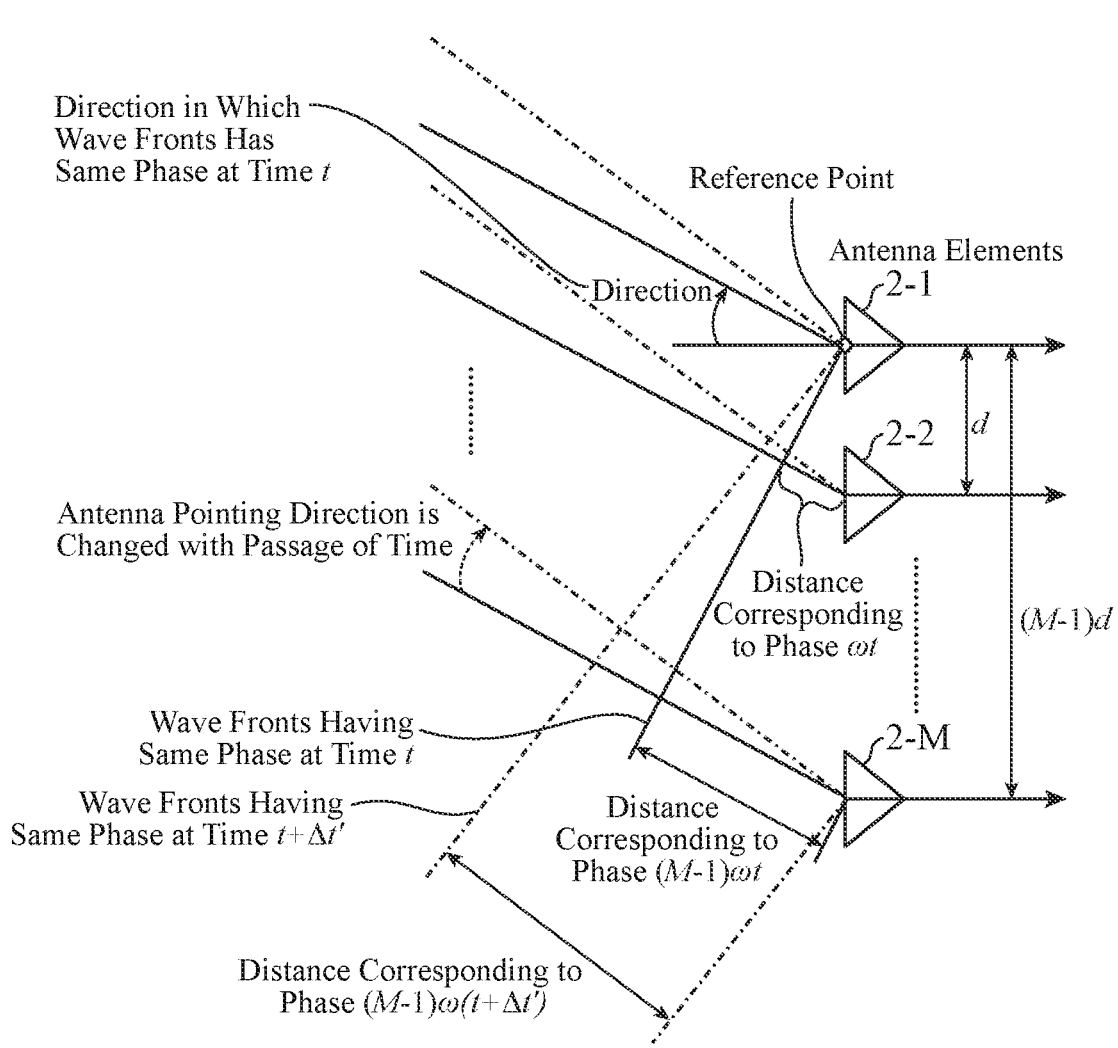
FIG. 6 is an explanatory drawing showing a relationship between an angular frequency and an orientation of an antenna pattern.

FIG. 6 shows a relationship between the angular frequency and the orientation of the antenna pattern. By using the M local oscillation signals $L_m(t)$ whose frequencies differ from one another by an integral multiple of the angular frequency $\omega$, the orientation of the antenna pattern can be changed in each of time slots.

Because it can be seen from the equation (5) that when the following equation (9) is satisfied, the beam (antenna pattern) is oriented towards a direction $\theta$, the beam can be formed in each of time slots.

$$-f_0 \frac{(m-1)d}{c} \sin\theta + (m-1)\Delta ft = 0 \quad (9)$$

Figure 7:
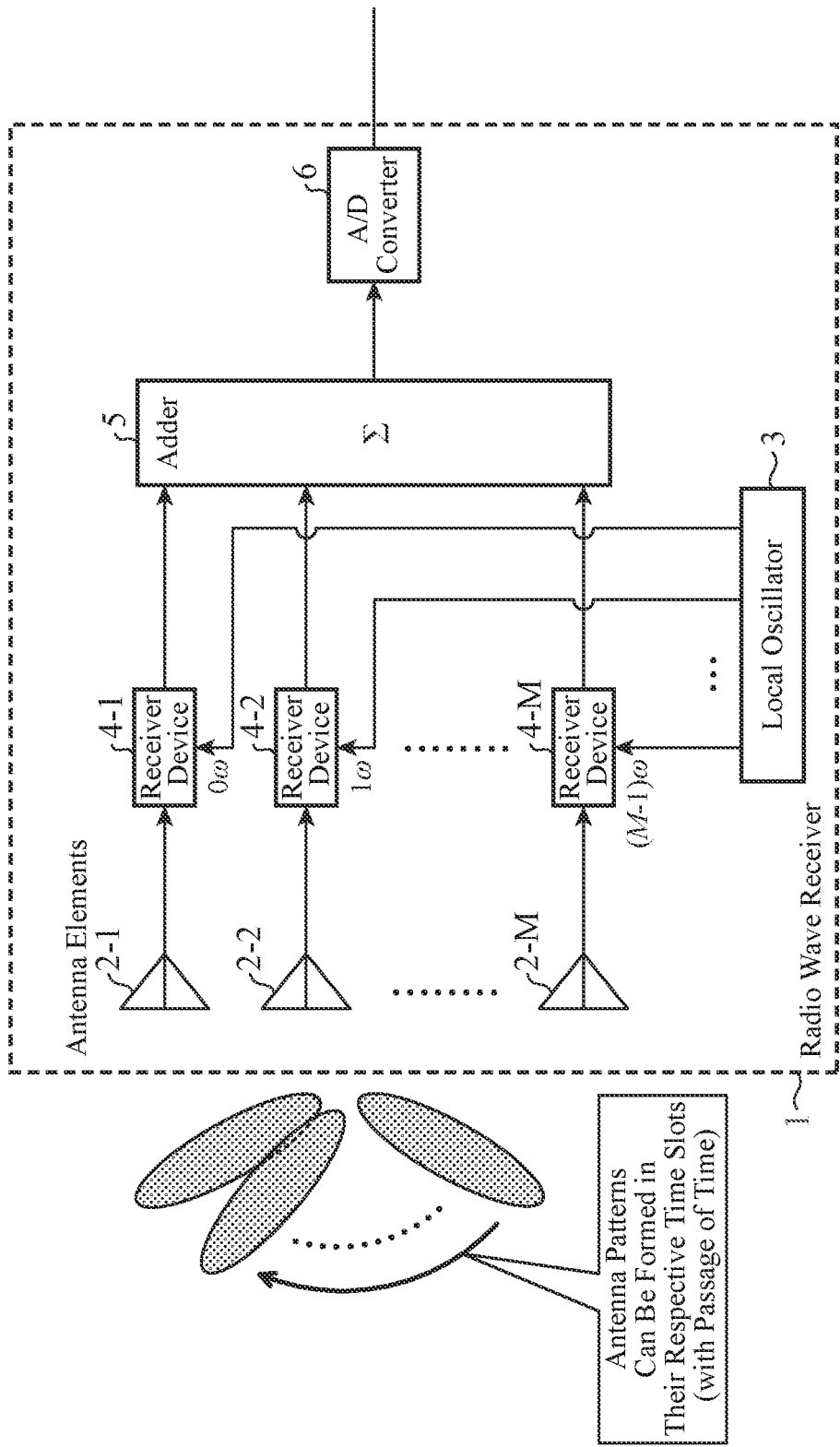
FIG. 7 is an explanatory drawing showing antenna patterns which are formed in their respective time slots.

FIG. 7 is an explanatory drawing showing antenna patterns which are formed in their respective time slots.

The beam (antenna pattern) at the time t can be calculated according to the following equation (10).

$$\theta = \sin^{-1}\left(\frac{c}{f_0 d}\Delta ft\right) \quad (10)$$

A DBF radar has to form an antenna pattern in each of directions by typically performing digital signal processing. More specifically, a DBF radar has to adjust the weight, the orientation and the phase for the received signal of each of antenna elements in accordance with the direction towards which the DBF radar is oriented. Therefore, a DBF radar has to carry out an enormous amount of arithmetic processing until the DBF radar searches for target candidates existing in a plurality of directions.

In this Embodiment 1, because the radio wave receiver 1 can form antenna patterns as shown in FIG. 7 in their respective time slots, by converting the frequencies of the received signals $Rx_m(t)$ of the antenna elements 2-*m* by using the M local oscillation signals $L_m(t)$ whose frequencies differ from one another by an integral multiple of the angular frequency $\omega$, without performing digital signal processing using a DBF technique, the amount of arithmetic processing can be reduced greatly.

Further, the radio wave receiver 1 has only to include the single A/D converter 6 mounted therein, and therefore an increase in the hardware scale can be avoided. As shown in FIG. 4B, a received video signal in the time domain can be acquired from each of directions, according to the equations (3) and (5). Therefore, because all the directions correspond to times, respectively, the direction pointing to each target can be calculated with a small amount of arithmetic processing.

Hereafter, the details of processing performed by the signal processor 7 will be explained.

When receiving the received video signal V(n) from the radio wave receiver 1, the target-candidate detector 8 of the signal processor 7 performs a process, e.g. a CFAR process, which is based on the signal power of the received video signal V(n), thereby detecting a target candidate. Because the CFAR process is a known technique, a detailed explanation of the CFAR process will be omitted hereafter.

When detecting a target candidate, the target-candidate detector 8 outputs the sampling number n' of the time corresponding to the peak power associated with the target candidate, as information showing the reception time n'$\Delta t$ of the radio wave from which the target candidate is detected, to the target-candidate direction calculator 9. The target-candidate detector also outputs the received video signal V(n) to the target-candidate direction calculator 9.

When receiving the sampling number n' from the target-candidate detector 8, the target-candidate direction calculator 9 calculates the direction $\theta'$ of the target candidate by using the sampling number n', as shown in the following equation (11), and outputs the direction $\theta'$ of the target candidate, the sampling number n' and the received video signal V(n) to the display device 10.

$$\theta' = \sin^{-1}\left(\frac{c}{f_0 d}\Delta fn'\Delta t\right) \quad (11)$$

Figure 8:
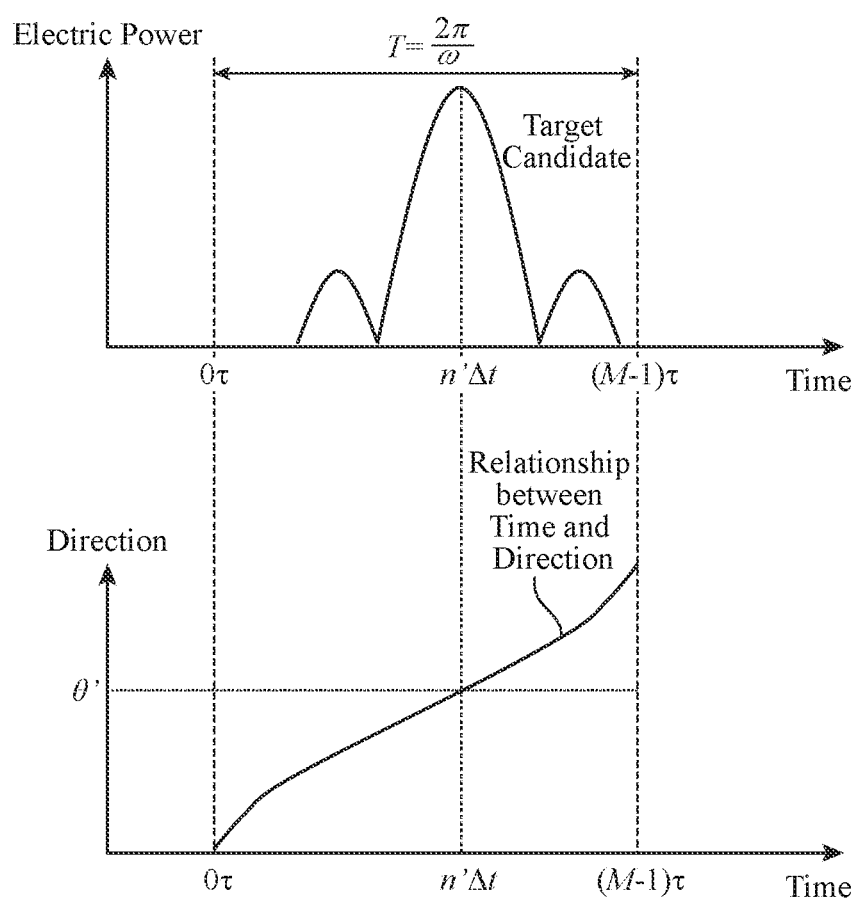
FIG. 8 is an explanatory drawing showing a target candidate at a sampling number n'.

FIG. 8 is an explanatory drawing showing the target candidate at the sampling number n'.

As shown in FIG. 8, by using the M local oscillation signals $L_m(t)$ whose frequencies differ from one another by an integral multiple of the angular frequency $\omega$, the relationship between the time and the direction becomes clear, and it becomes possible to calculate the direction pointing to the target detected in the time domain with a small amount of arithmetic processing.

While it is necessary to use a plurality of antenna patterns in monopulse angle measurement, and it is difficult to carry out angle measurement when a plurality of targets exist, because in this Embodiment 1, even when a plurality of targets exist, their directions can be calculated by using the above-mentioned equation (11), it becomes possible to calculate the directions of a plurality of targets with a small amount of arithmetic processing.

When receiving the direction $\theta'$ of the target candidate, the sampling number n' and the received video signal V(n) from the target-candidate direction calculator 9 of the signal processor 7, the display device 10 displays the direction $\theta'$ of the target candidate, the sampling number n' and the received video signal V(n), as the searched results, on the screen thereof.

As can be seen from the above description, because the radar apparatus according to Embodiment 1 is configured in such a way that the radar apparatus includes the local oscillator 3 for generating M local oscillation signals $L_m(t)$ whose frequencies differ from one another by an integral multiple of the preset angular frequency $\omega$, the receiver devices 4-*m* each for converting the frequency of the received signal $Rx_m(t)$ of the antenna element 2-*m* by using the local oscillation signal $L_m(t)$ generated by the local oscillator 3, thereby generating a received video signal $V_m(t)$ having an antenna element number m, the adder 5 for adding the received video signals $V_1(t)$ to $V_M(t)$ generated by the M receiver devices 4-1 to 4-M, and outputting a received video signal $V_{sum}(t)$ after addition, and the A/D converter 6 for A/D converting the received video signal $V_{sum}(t)$ outputted from the adder 5, thereby generating a received video signal V(n) which is a digital signal, and the target-candidate detector 8 detects a target candidate in accordance with the signal power of the received video signal V(n) generated by the A/D converter 6 and the target-candidate direction calculator 9 calculates the direction θ' of the target candidate by using the sampling number n' of the time corresponding to the peak power associated with the target candidate detected by the target-candidate detector 8, there is provided an advantage of being able to search for target candidates existing in a plurality of directions with a low amount of arithmetic processing while being able to reduce the hardware scale.

More specifically, because the radio wave receiver 1 according to Embodiment 1 can form antenna patterns as shown in FIG. 7 in their respective time slots, by converting the frequencies of the received signals $Rx_m(t)$ of the antenna elements 2-m by using the M local oscillation signals $L_m(t)$ whose frequencies differ from one another by an integral multiple of the angular frequency ω, without performing digital signal processing using a DBF technique, the amount of arithmetic processing can be reduced greatly.

Further, the radio wave receiver 1 has only to include the single A/D converter 6 mounted therein, and therefore an increase in the hardware scale can be avoided. Further, because the relationship between the time and the direction is clear, the direction θ' of a target candidate can be calculated with a small amount of arithmetic processing.

Although in this Embodiment 1 the radar apparatus in which a radio wave transmitter for radiating a radio wave into space is not equipped is shown, the same advantages can be provided even in a case in which this embodiment is applied to a radar apparatus equipped with a radio wave transmitter.

Further, although in this Embodiment 1 an example of the uniform linear array in which the antenna elements 2-1 to 2-M are disposed at equal intervals is shown, the antenna elements 2-1 to 2-M can be alternatively configured in a two-dimensional array, and the same advantages can be provided by this variant.

Embodiment 2

Figure 9:
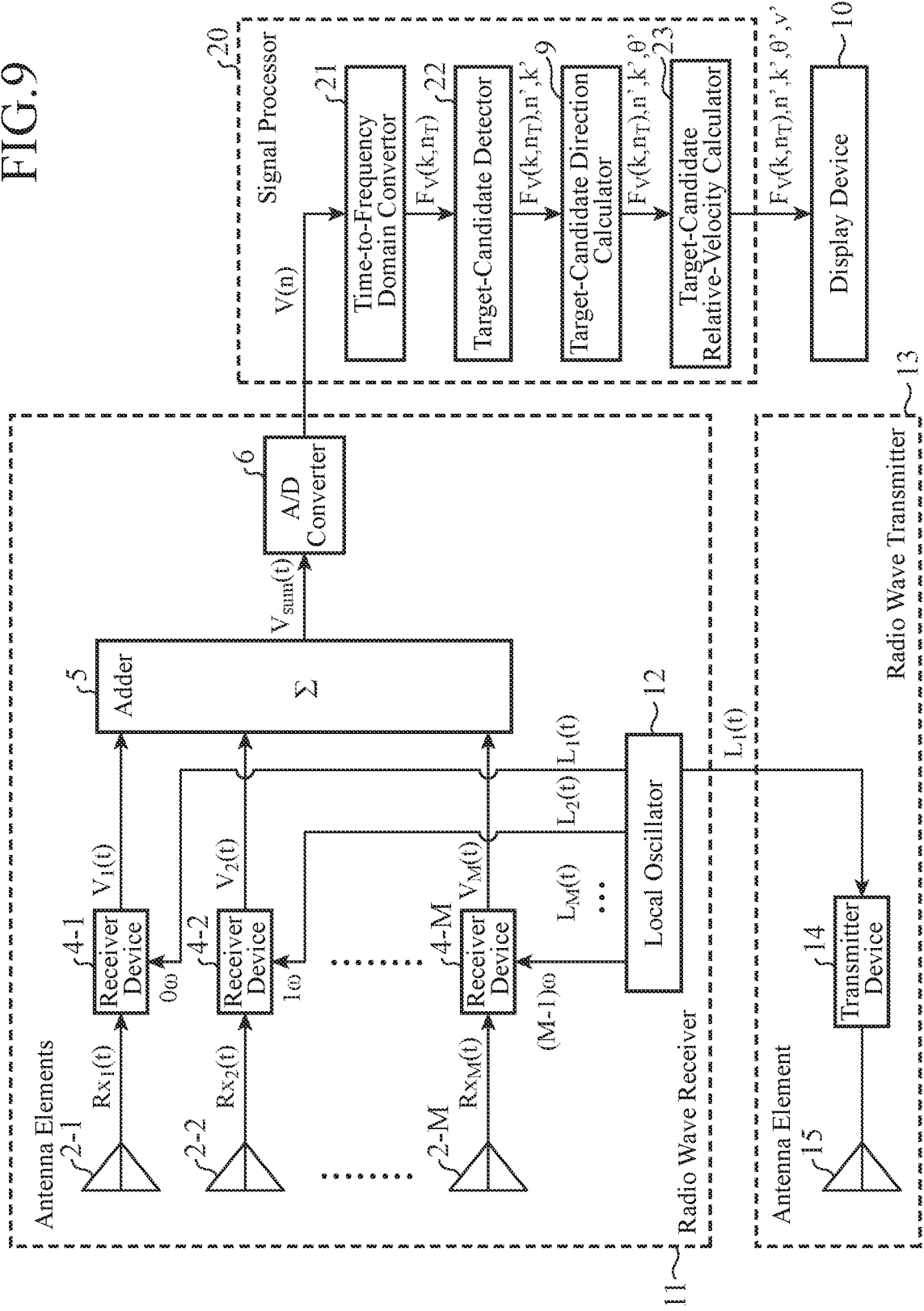
FIG. 9 is a configuration diagram showing a radar apparatus according to Embodiment 2 of the present invention.

FIG. 9 is a configuration diagram showing a radar apparatus according to Embodiment 2 of the present invention. In FIG. 9, because the same reference numerals as those shown in FIG. 3 denote the same components or like components, the explanation of the components will be omitted hereafter.

A radio wave receiver 11 is an antenna device that, while changing the pointing direction of an antenna pattern in each of time slots, receives a radio wave which is scattered by a target candidate after being radiated from a radio wave transmitter 13, to generate a received video signal, and is comprised of M antenna elements 2-1 to 2-M, a local oscillator 12, M receiver devices 4-1 to 4-M, an adder 5 and an A/D converter 6.

The local oscillator 12 of the radio wave receiver 11 generates M local oscillation signals $L_1(t)$ to $L_M(t)$ and outputs the M local oscillation signals $L_1(t)$ to $L_M(t)$ to the receiver devices 4-1 to 4-M, like the local oscillator 3 shown in FIG. 1, and also outputs a local oscillation signal $L_1(t)$ which is the same as the local oscillation signal $L_1(t)$ outputted to the receiver device 4-1 to a transmitter device 14 of a radio wave transmitter 13.

The radio wave transmitter 13 is comprised of the transmitter device 14 and an antenna element 15, and the transmitter device 14 generates a transmission signal by using the local oscillation signal $L_1(t)$ outputted from the local oscillator 12.

The antenna element 15 radiates the transmission signal generated by the transmitter device 14, as a radio wave, into space.

A signal processor 20 is comprised of a time-to-frequency domain convertor 21, a target-candidate detector 22, a target-candidate direction calculator 9 and a target-candidate relative-velocity calculator 23.

The time-to-frequency domain convertor 21 converts a received video signal V(n) generated by the A/D converter 6 of the radio wave receiver 1 into a received video signal V'(h, $n_T$), and, after that, performs a discrete Fourier transform process on the received video signal V'(h, $n_T$), thereby converting the received video signal V' (h, $n_T$) into a received video signal $F_V(k, n_T)$ which is a signal in a frequency domain. $n_T$ denotes a sampling number within a time period T during which the phase of an angular frequency ω goes around once, h denotes a repetition number of the time period T, and k denotes a sampling number in the frequency domain.

The target-candidate detector 22 performs a process, e.g. a CFAR process, which is based on the signal power of the received video signal $F_V(k, n_T)$ after conversion by the time-to-frequency domain convertor 21, thereby detecting a target candidate. When detecting a target candidate, the target-candidate detector 22 outputs the sampling number k' in the frequency domain corresponding to the peak power associated with the target candidate, as information showing the frequency at which the target candidate is detected.

The target-candidate relative-velocity calculator 23 performs a process of calculating a relative velocity v' of the target candidate from the sampling number k' in the frequency domain outputted from the target-candidate detector 22.

In the example shown in FIG. 9, it is assumed that the time-to-frequency domain convertor 21, the target-candidate detector 22, the target-candidate direction calculator 9 and the target-candidate relative-velocity calculator 23, which are the components of the signal processor 20, consist of pieces of hardware for exclusive use (e.g. semiconductor integrated circuits each equipped with a CPU (Central Processing Unit), one chip microcomputers or the likes), respectively. As an alternative, the signal processor 20 can consist of a computer.

In the case in which the signal processor 20 consists of a computer, it is preferable that a program in which the details of processes performed by the time-to-frequency domain convertor 21, the target-candidate detector 22, the target-candidate direction calculator 9 and the target-candidate relative-velocity calculator 23 are described is stored in a memory device 51 of the computer, as shown in FIG. 2, and a processor 52, such as a CPU of the computer, executes the program stored in the memory device 51.

Next, operations will be explained.

The local oscillator 12 of the radio wave receiver 11 generates M local oscillation signals $L_1(t)$ to $L_M(t)$, as shown in the equation (3), whose frequencies differ from one another by an integral multiple of the angular frequency ω, like the local oscillator 3 shown n FIG. 1.

The local oscillator 12 outputs the M local oscillation signals $L_1(t)$ to $L_M(t)$ to the receiver devices 4-1 to 4-M, and also outputs a local oscillation signal $L_1(t)$ which is the same as the local oscillation signal $L_1(t)$ outputted to the receiver device 4-1 and which is expressed by the following equation (12) to the transmitter device 14 of the radio wave transmitter 13.

$$L_1(t) = A_L \exp(j2\pi f_0 t)$$

$$(0 \le t < T_{obs}) \quad (12)$$

When receiving the local oscillation signal $L_1(t)$ from the local oscillator 12, the transmitter device 14 of the radio wave transmitter 13 generates a transmission signal by using the local oscillation signal $L_1(t)$.

As a result, the transmission signal is radiated into space as a radio wave from the antenna element 15 of the radio wave transmitter 13.

A radio wave which is included in the radio wave radiated from the antenna element 15 into space and which is reflected by a target and then returns is received by the antenna elements 2-1 to 2-M.

In this case, the received signal $Rx_m(t)$ of each antenna element 2-m is shown by the above-mentioned equation (1).

In this Embodiment 2, it is assumed that target candidates are moving targets, and the received signal $Rx_0(t)$ of the antenna element 2-1 disposed at a reference point is shown by the following equation (13). $Rx_0(t) = Rx_1(t)$ holds.

$$Rx_0(t) = A_{Rx} \exp\left(j2\pi f_0\left(t - \frac{2(R_0 - vt)}{c}\right)\right) \quad (13)$$

$$(0 \le t < T_{obs})$$

In the equation (13), v denotes a relative velocity of a moving target.

When the local oscillator 3 generates the M local oscillation signals $L_m(t)$, each receiver device 4-m (m=1, 2, ..., M) converts (downconverts) the frequency of the received signal $Rx_m(t)$ of the antenna element 2-m by using the local oscillation signal $L_m(t)$, thereby generating a received video signal $V_m(t)$ having an antenna element number m, like that according to above-mentioned Embodiment 1.

When the M receiver devices 4-1 to 4-M generate the received video signals $V_1(t)$ to $V_M(t)$, the adder 5 adds the received video signals $V_1(t)$ to $V_M(t)$ and outputs a received video signal $V_{sum}(t)$ after addition to the A/D converter 6, like that according to above-mentioned Embodiment 1.

As an alternative, the adder 5 can perform a window function process of applying weights to the respective received video signals $V_1(t)$ to $V_M(t)$ and then adding the weighted received video signals, thereby reducing the side lobes of the antenna pattern, like that according to above-mentioned Embodiment 1.

When receiving the received video signal $V_{sum}(t)$ after addition from the adder 5, the A/D converter 6 A/D-converts the received video signal $V_{sum}(t)$, thereby generating a received video signal $V(n)$ which is a digital signal expressed by the above-mentioned equation (8), like that according to above-mentioned Embodiment 1.

When receiving the received video signal $V(n)$ from the A/D converter 6 of the radio wave receiver 11, the time-to-frequency domain convertor 21 of the signal processor 20 converts the received video signal $V(n)$ into a received video signal $V'(h, n_T)$ according to the following equation (14).

$$V'(h, n_T) = V((h-1)H + n_T) \quad (14)$$

$$(h = 1, 2, \ldots, H)$$

$$(n_T = 1, 2, \ldots, N_T)$$

$$N_T = \frac{T}{\Delta t} \quad (15)$$

$$H = \frac{T_{obs}}{T} \quad (16)$$

In the equations (14) to (16), $n_T$ denotes a sampling number within a time period T during which the phase of the angular frequency ω goes around once, $N_T$ denotes the number of sampling points within the time period T during which the phase of the angular frequency ω goes around once, h denotes a repetition number of the time period T, and H denotes the number of repetitions of the time period T during the reception time $T_{obs}$ of the radio wave.

The time-to-frequency domain convertor 21 further performs a discrete Fourier transform process on the received video signal $V'(h, n_T)$, thereby converting the received video signal $V'(h, n_T)$ into a received video signal $F_V(k, n_T)$ which is a signal in the frequency domain, as shown in the following equation (17).

$$F_V(k, n_T) = \sum_{h=0}^{H-1} V'(h, n_T) \exp\left(-j2\pi \frac{h}{H_{FFT}} k\right) \quad (17)$$

$$(n_T = 1, 2, \ldots, N_T)$$

$$(k = 0, 1, \ldots, H_{FFT} - 1)$$

In the equation (17), $H_{FFT}$ denotes the number of conversion points in the frequency domain, and k denotes a sampling number in the frequency domain.

Because the time-to-frequency domain convertor 21 converts the received video signal into a signal in the frequency domain by using a discrete Fourier transform, there is provided an advantageous effect of performing coherent integration of the received signal, and the SNR (Signal to Noise Ratio) is improved.

When receiving the received video signal $F_V(k, n_T)$ which is a signal in the frequency domain from the time-to-frequency domain convertor 21, the target-candidate detector 22 of the signal processor 20 performs a process, e.g. a CFAR process, which is based on the signal power of the received video signal $F_V(k, n_T)$, thereby detecting a target candidate.

When detecting a target candidate, the target-candidate detector 22 outputs the sampling number k' in the frequency domain corresponding to the peak power associated with the target candidate, and the sampling number n' corresponding to the sampling number k' (the number showing the reception time of the radio wave from which the target candidate is detected), as information showing the frequency at which the target candidate is detected, to the target-candidate direction calculator 9. The target-candidate detector also outputs the received video signal $F_V(k, n_T)$ to the target-candidate direction calculator 9.

When receiving the sampling number n' from the target-candidate detector 22, the target-candidate direction calculator 9 of the signal processor 20 calculates a direction θ' of the target candidate by using the sampling number n', like that according to above-mentioned Embodiment 1, and outputs the direction θ' of the target candidate, the sampling number k', the sampling number n' and the received video signal $F_V(k, n_T)$ to the target-candidate relative-velocity calculator 23.

When receiving the sampling number k' in the frequency domain from the target-candidate direction calculator 9, the target-candidate relative-velocity calculator 23 of the signal processor 20 calculates a relative velocity v' of the target candidate from the sampling number k', as shown in the following equation (18), and outputs the relative velocity v' of the target candidate, the direction θ' of the target candidate, the sampling number k', the sampling number n' and the received video signal $F_V(k, n_T)$ to a display device 10.

$$v'=k'\Delta v_{samp} \quad (18)$$

In the equation (18), $\Delta v_{samp}$ denotes a speed sampling interval.

When receiving the relative velocity v', the direction θ' of the target candidate, the sampling number k', the sampling number n' and the received video signal $F_V(k, n_T)$ from the target-candidate relative-velocity calculator 23 of the signal processor 20, the display device 10 displays the relative velocity v', the direction θ' of the target candidate, the sampling number k', the sampling number n' and the received video signal $F_V(k, n_T)$, as searched results, on the screen thereof.

Figure 10:
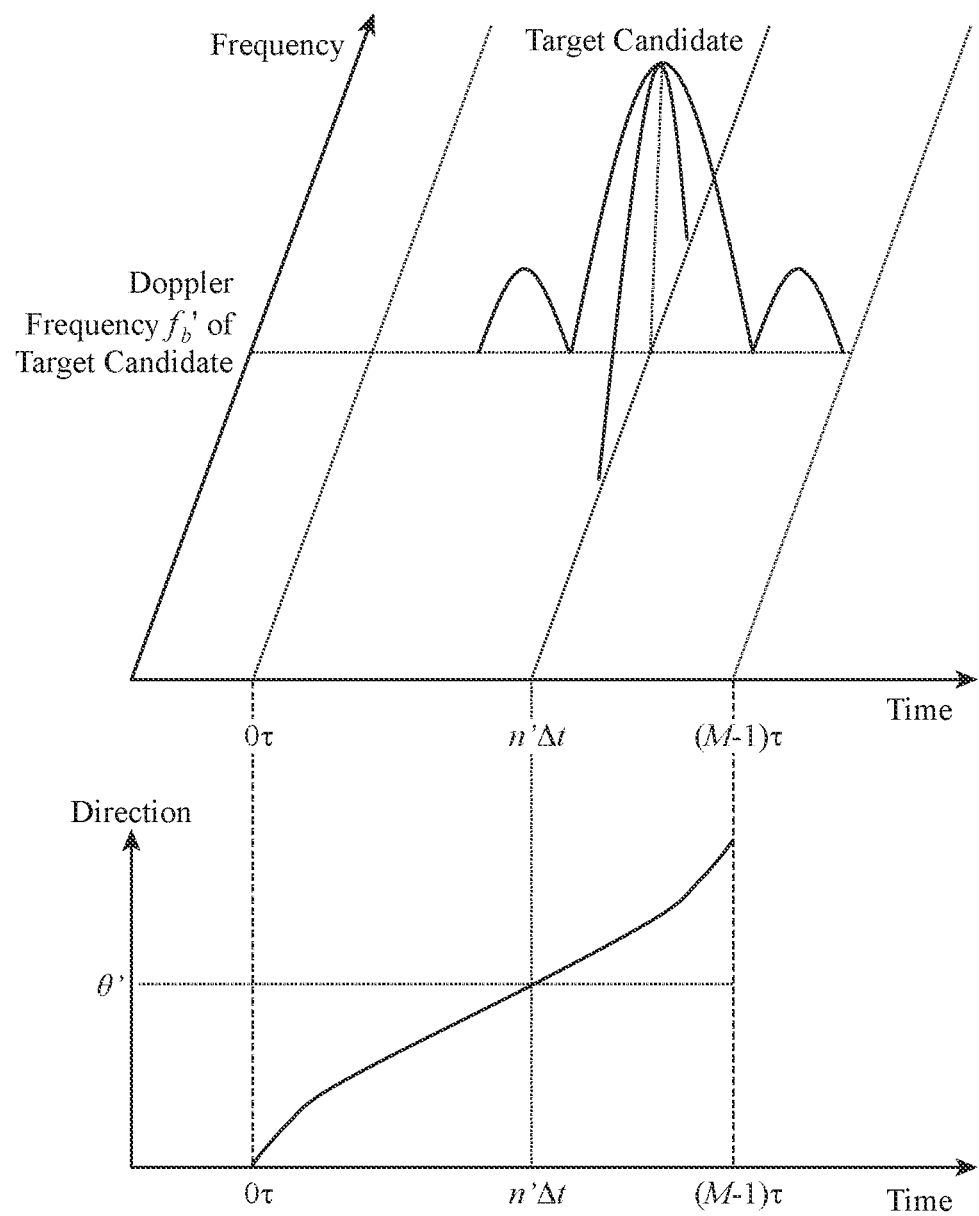
FIG. 10 is an explanatory drawing showing a target candidate at a sampling number n' and at a sampling number k' in a frequency domain.

FIG. 10 is an explanatory drawing showing the target candidate at the sampling number n' and at the sampling number k' in the frequency domain. The searched results as shown in FIG. 10 are displayed on the display device 10.

The signal processor 20 can calculate the direction pointing to the target candidate without forming an antenna pattern in each of directions, and can also calculate the relative velocity v' of a target existing in each of the directions.

As can be seen from the above description, because the radar apparatus according to this Embodiment 2 includes the radio wave receiver 11 corresponding to the radio wave receiver 1 shown in FIG. 1, this embodiment provides an advantage of being able to search for target candidates existing in a plurality of directions with a low amount of arithmetic processing while being able to reduce the hardware scale, like above-mentioned Embodiment 1.

Further, because the radar apparatus according to this Embodiment 2 includes the target-candidate relative-velocity calculator 23 for calculating the relative velocity v' of each of target candidates by using the sampling number k' in the frequency domain outputted from the target-candidate detector 22, there is provided an advantage of being able to calculate the relative velocity v' of each of target candidates with a low amount of arithmetic processing.

Although the example in which the radar apparatus includes the signal processor 20 is shown in this Embodiment 2, the radar apparatus shown in FIG. 1 can include the signal processor 20 instead of the signal processor 7.

Further, although the example in which the radar apparatus includes the radio wave transmitter 13 is shown in this Embodiment 2, the radar apparatus does not have to include the radio wave transmitter 13, like the radar apparatus shown in FIG. 1.

Embodiment 3

Figure 11:
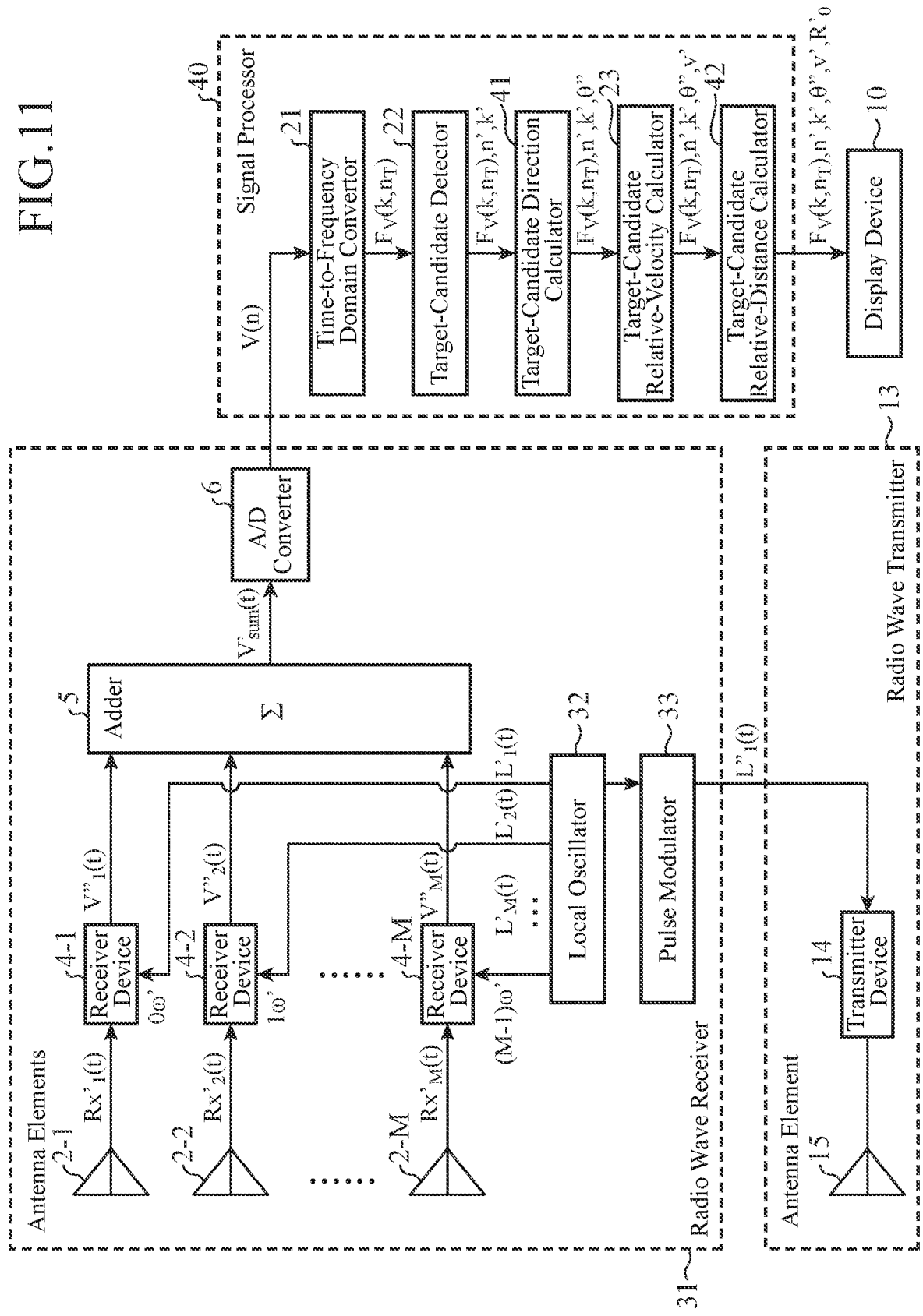
FIG. 11 is a configuration diagram showing a radar apparatus according to Embodiment 3 of the present invention.

FIG. 11 is a configuration diagram showing a radar apparatus according to Embodiment 3 of the present invention. In FIG. 11, because the same reference numerals as those shown in FIG. 9 denote the same components or like components, the explanation of the components will be omitted hereafter.

A radio wave receiver 31 is an antenna device that, while changing the pointing direction of an antenna pattern in each of time slots, receives a radio wave which is scattered by a target candidate after being radiated from a radio wave transmitter 13, to generate a received video signal, and is comprised of M antenna elements 2-1 to 2-M, M receiver devices 4-1 to 4-M, a local oscillator 32, a pulse modulator 33, an adder 5 and an A/D converter 6.

The local oscillator 32 of the radio wave receiver 31 generates M local oscillation signals $L'_1(t)$ to $L'_M(t)$ whose frequencies differ from one another by an integral multiple of a preset angular frequency ω' and outputs the M local oscillation signals $L'_1(t)$ to $L'_M(t)$ to the receiver devices 4-1 to 4-M, and also outputs a local oscillation signal $L'_1(t)$ which is the same as the local oscillation signal $L'_1(t)$ outputted to the receiver device 4-1 to the pulse modulator 33. The period T of the angular frequency ω' is set as the pulse width $T_{pls}$ of a pulse signal generated by the pulse modulator 33, and the angular frequency ω' is set to the value of $2\pi/T_{pls}$ (a value which is acquired by dividing 360 degrees by the pulse width $T_{pls}$ of the radio wave).

The pulse modulator 33 pulse-modulates the local oscillation signal $L'_1(t)$ outputted from the local oscillator 32, and outputs a local oscillation signal $L''_1(t)$ after pulse modulation to a transmitter device 14.

A signal processor 40 is comprised of a time-to-frequency domain convertor 21, a target-candidate detector 22, a target-candidate direction calculator 41, a target-candidate relative-velocity calculator 23 and a target-candidate relative-distance calculator 42.

The target-candidate direction calculator 41 performs a process of calculating a direction θ'' of a target candidate by using a sampling number n' outputted from the target-candidate detector 22.

The target-candidate relative-distance calculator 42 performs a process of calculating a relative distance $R'_0$ of the target candidate by using the sampling number n' outputted from the target-candidate relative-velocity calculator 23.

In the example shown in FIG. 11, it is assumed that the time-to-frequency domain convertor 21, the target-candidate detector 22, the target-candidate direction calculator 41, the target-candidate relative-velocity calculator 23 and the target-candidate relative-distance calculator 42, which are the components of the signal processor 40, consist of pieces of hardware for exclusive use (e.g. semiconductor integrated circuits each equipped with a Central Processing Unit (CPU), one chip microcomputers or similar devices), respectively. As an alternative, the signal processor 20 can consist of a computer.

In the case in which the signal processor 40 consists of a computer, it is preferable that a program in which the details of processes performed by the time-to-frequency domain convertor 21, the target-candidate detector 22, the target-candidate direction calculator 41, the target-candidate relative-velocity calculator 23 and the target-candidate relative-distance calculator 42 are described is stored in a memory device 51 of the computer, as shown in FIG. 2, and a processor 52, such as a CPU of the computer, executes the program stored in the memory device 51.

Next, operations will be explained.

The local oscillator 32 of the radio wave receiver 31 generates M local oscillation signals L'$_1$(t) to L'$_M$(t) whose frequencies differ from one another by an integral multiple of the preset angular frequency ω', as shown in the following equation (19).

$$L'_m(t) = A_L \exp(j2\pi f_0 t)\exp(-j(m-1)\omega' t) \quad (19)$$
$$= A_L \exp(j(2\pi f_0 - (m-1)\omega')t)$$
$$= A_L \exp(j2\pi(f_0 - (m-1)\Delta f')t)$$
$$(0 \le t < T_{obs})$$
$$(m = 1, 2, \ldots, M)$$

$$\omega' = \frac{2\pi}{T_{pls}} = 2\pi\Delta f' \quad (20)$$

In the equation (19), $A_L$ denotes the amplitude of the local oscillation signal L'$_m$(t), $T_{pls}$ denotes the pulse width of a pulse signal generated by the pulse modulator 33, and Δf' denotes the frequency interval between adjacent antenna elements.

The local oscillator 32 outputs the M local oscillation signals L'$_1$(t) to L'$_M$(t) to the receiver devices 4-1 to 4-M, and also outputs a local oscillation signal L'$_1$(t) which is the same as the local oscillation signal L'$_1$(t) outputted to the receiver device 4-1 to the pulse modulator 33.

Figure 12:
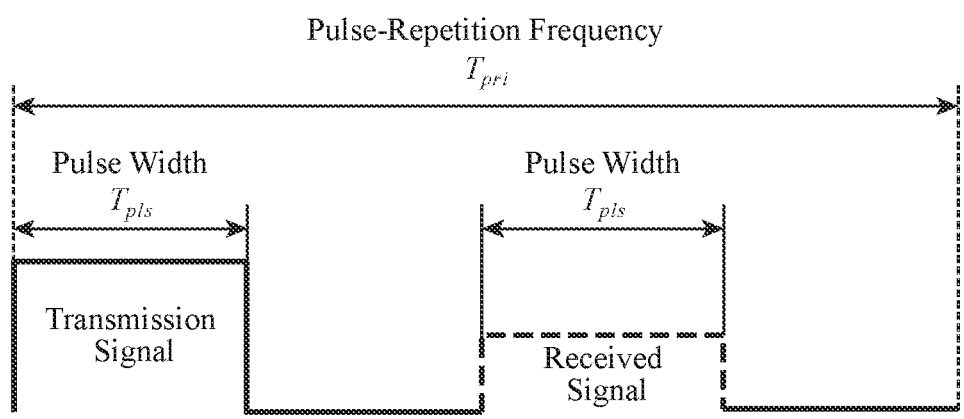
FIG. 12 is an explanatory drawing showing a relationship between a pulse width $T_{pls}$ and a pulse repetition interval $T_{pri}$.
Figure 13A:
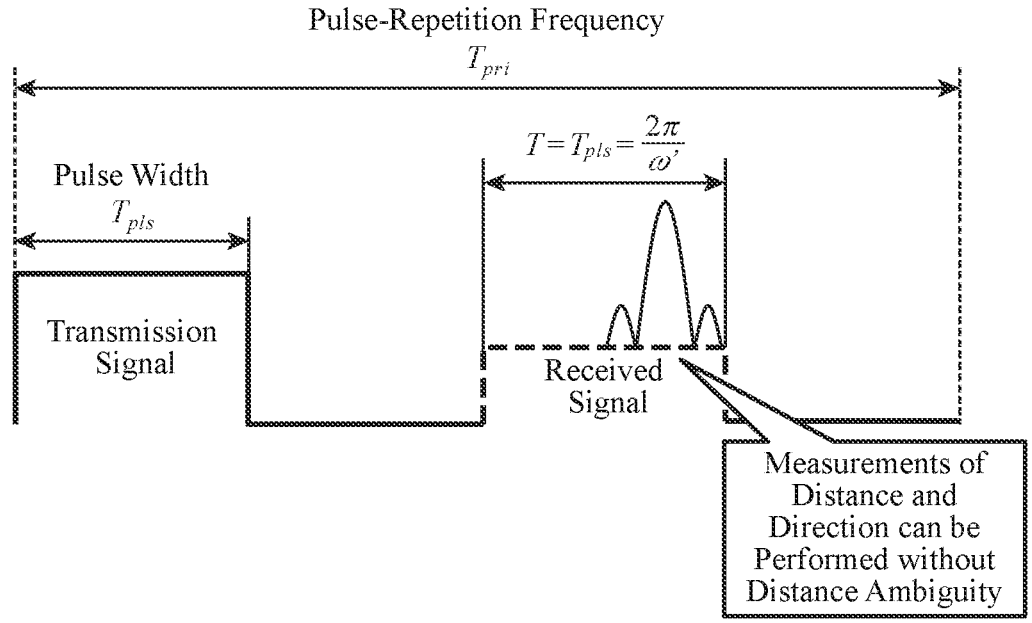
FIGS. 13A and 13B are explanatory drawings showing relationships between the period T of an angular frequency ω' and the pulse width $T_{pls}$.
Figure 13B:
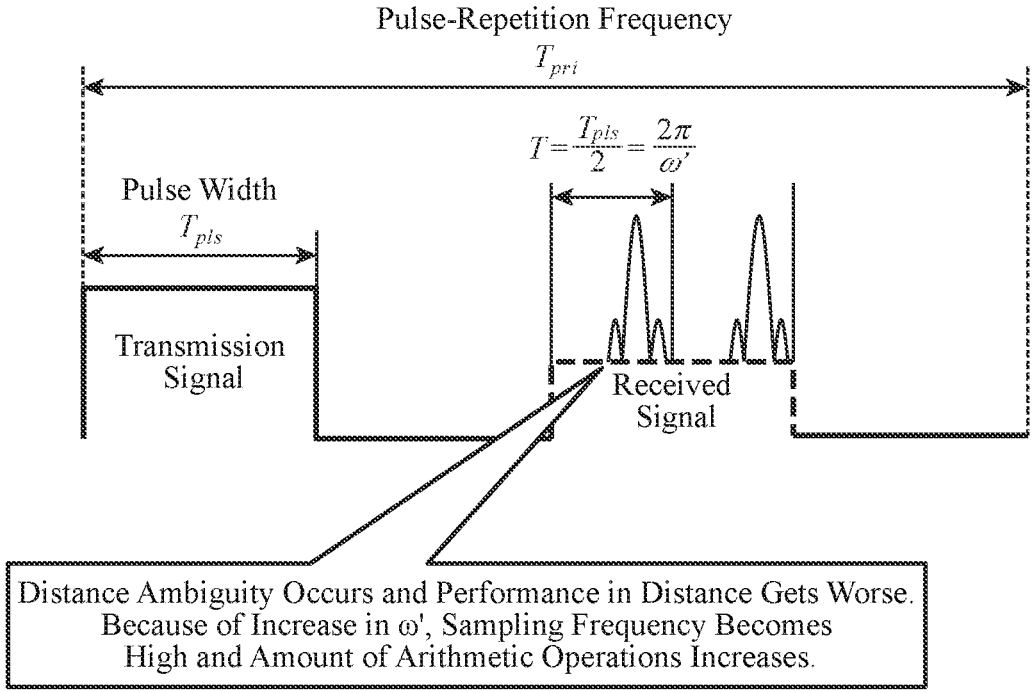

FIG. 12 is an explanatory drawing showing a relationship between the pulse width $T_{pls}$ and a pulse repetition interval $T_{pri}$, and FIGS. 13A and 13B are explanatory drawings showing relationships between the period T of the angular frequency ω' and the pulse width $T_{pls}$.

In the local oscillator 32, the period T of the angular frequency ω' is set as the pulse width $T_{pls}$, as shown in FIG. 13A, and the angular frequency ω' is set to the value of $2\pi/T_{pls}$, as shown in the equation (20).

When the period T of the angular frequency ω' is set to one-half of the pulse width $T_{pls}$, there arises a problem that two peaks occur in a pulse and distance ambiguity occurs, as shown in FIG. 13B. Further, because the angular frequency ω' becomes high, the sampling frequency also becomes high, and the amount of arithmetic processing and the hardware scale become large.

In contrast with this, in this Embodiment 3, because the period T of the angular frequency ω' is set as the pulse width $T_{pls}$, the distance ambiguity within the pulse width is eliminated, and the amount of arithmetic processing and the hardware scale can be reduced, as shown in FIG. 13A.

When receiving the local oscillation signal L'$_1$(t) from the local oscillator 32, the pulse modulator 33 pulse-modulates the local oscillation signal L'$_1$(t), as shown in the following equation (21), and outputs a local oscillation signal L"$_1$(t) after pulse modulation to the transmitter device 14.

$$L''_1(t) = \begin{cases} A_L \exp(j2\pi f_0 t), & hT_{pri} \le t \le hT_{pri} + T_{pls} \\ 0, & \text{otherwise} \end{cases} \quad (21)$$

$$(h = 0, 1, \ldots, H' - 1)$$

$$H' = \frac{T_{obs}}{T_{pri}} \quad (22)$$

In the equation (21), h denotes a hit number, and H' denotes the number of hits.

When receiving the local oscillation signal L"$_1$(t) after pulse modulation from the pulse modulator 33, the transmitter device 14 of the radio wave transmitter 13 generates a transmission signal by using the local oscillation signal L"$_1$(t).

As a result, the transmission signal is radiated, as a radio wave, from the antenna element 15 of the radio wave transmitter 13 into space.

A radio wave which is included in the radio wave radiated from the antenna element 15 into space and which is reflected by a target and then returns is received by the antenna elements 2-1 to 2-M.

When the antenna elements 2-1 to 2-M receive a radio wave incident thereupon, the radio wave being scattered by a target existing in a direction of θ and at a relative distance of $R_0$, and moving at a relative distance of v, the received signal Rx'$_m$(t) of each antenna element 2-m is shown by the following equation (23).

Further, the received signal Rx'$_0$(t) of the antenna element 2-1 disposed at a reference point is shown by the following equation (24). Rx'$_0$(t)=Rx'$_1$(t) holds.

$$Rx'_m(t) = \begin{cases} Rx'_0(t)\exp\left(-j2\pi f_0 \frac{(m-1)d}{c}\sin\theta\right), \\ hT_{pri} + \frac{2R_0}{c} \le t \le hT_{pri} + \frac{2R_0}{c} + T_{pls} \\ 0, \quad \text{otherwise} \end{cases} \quad (23)$$

$$(0 \le t < T_{obs})$$
$$(m = 1, 2, \ldots, M)$$

$$Rx'_0(t) = \begin{cases} A_{Rx}\exp\left(j\left\{2\pi f_0\left[t - \frac{2(R_0 - v_0 t)}{c}\right]\right\}\right), \\ hT_{pri} + \frac{2R_0}{c} \le t \le hT_{pri} + \frac{2R_0}{c} + T_{pls} \\ 0, \quad \text{otherwise} \end{cases} \quad (24)$$

$$(0 \le t < T_{obs})$$

In the equations (23) and (24), t denotes a time, $T_{obs}$ denotes the reception time of the radio wave, $f_0$ denotes the transmission frequency, M denotes the number of antenna elements, m denotes the antenna element number, d denotes the antenna element interval length, c denotes the speed of light, and $A_{Rx}$ denotes the amplitude of the received signal Rx'$_0$(t).

When the local oscillator 32 generates the M local oscillation signals L'$_m$(t), each receiver device 4-m (m=1, 2, ..., M) converts (downconverts) the frequency of the received signal Rx'$_m$(t) of the antenna element 2-m by using the local oscillation signal L'$_m$(t), thereby generating a received video signal V"$_m$(t) having the antenna element number m, as shown in the following equation (25).

$$V''_m(t) = Rx'_m(t)L'^{*}_m(t)$$
$$= \begin{cases} A_{V,m}\exp\left(j2\pi f_0\left(-\frac{2(R_0-vt)}{c}\right)\right)\exp\left(j2\pi\left(-f_0\frac{(m-1)d}{c}\sin\theta + (m-1)\Delta f't\right)\right), \\ \qquad hT_{pri} + \frac{2R_0}{c} \leq t \leq hT_{pri} + \frac{2R_0}{c} + T_{pls} \\ 0, \quad \text{otherwise} \end{cases}$$

$(0 \leq t < T_{obs})$
$(m = 1, 2, \ldots, M)$ (25)

In the equation (25), $A_{v,m}$ denotes the amplitude of the received video signal $V''_m(t)$ having the antenna element number m, and * denotes complex conjugate.

When the M receiver devices 4-1 to 4-M generate the received video signals $V''_1(t)$ to $V''_M(t)$, the adder 5 adds the received video signals $V''_1(t)$ to $V''_M(t)$ and outputs a received video signal $V'_{sum}(t)$ after addition to the A/D converter 6, like that according to above-mentioned Embodiment 1.

As an alternative, the adder 5 can perform a window function process of applying weights to the respective M received video signals $V''_1(t)$ to $V''_M(t)$ and then adding the weighted received video signals, thereby reducing the side lobes of the antenna pattern, like that according to above-mentioned Embodiment 1.

When receiving the received video signal $V'_{sum}(t)$ after addition from the adder 5, the A/D converter 6 A/D-converts the received video signal $V'_{sum}(t)$, thereby generating a received video signal V(n) which is a digital signal expressed by the above-mentioned equation (8), like that according to above-mentioned Embodiment 1.

When receiving the received video signal V(n) from the A/D converter 6 of the radio wave receiver 31, the time-to-frequency domain convertor 21 of the signal processor 40 converts the received video signal V(n) into a received video signal V'(h, $n_T$) in accordance with the equation (14), and, after that, performs a discrete Fourier transform process on the received video signal V'(h, $n_T$), thereby converting the received video signal V'(h, $n_T$) into a received video signal $F_V(k, n_T)$ which is a signal in the frequency domain, like that according to above-mentioned Embodiment 2.

When receiving the received video signal $F_V(k, n_T)$ which is a signal in the frequency domain from the time-to-frequency domain convertor 21, the target-candidate detector 22 of the signal processor 40 performs a process, e.g. a CFAR process, which is based on the signal power of the received video signal $F_V(k, n_T)$, thereby detecting a target candidate, like that according to above-mentioned Embodiment 2.

When detecting a target candidate, the target-candidate detector 22 outputs the sampling number k' in the frequency domain corresponding to the peak power associated with the target candidate, and the sampling number n' corresponding to the sampling number k', as information showing the frequency at which the target candidate is detected, to the target-candidate direction calculator 41. The target-candidate detector also outputs the received video signal $F_V(k, n_T)$ to the target-candidate direction calculator 41.

When receiving the sampling number n' from the target-candidate detector 22, the target-candidate direction calculator 41 of the signal processor 40 calculates the direction θ" of the target candidate by using the sampling number n', as shown in the following equation (26), and outputs the direction θ" of the target candidate, the sampling number k', the sampling number n' and the received video signal $F_V(k, n_T)$ to the target-candidate relative-velocity calculator 23.

$$\theta'' = \sin^{-1}\left(\frac{c}{f_0 d}\Delta f \bmod(n'\Delta t, T_{pls})\right) \quad (26)$$

In the equation (26), mod(X, Y) is a mathematical symbol showing the remainder which is left over by dividing a variable X by a variable Y.

When receiving the sampling number k' in the frequency domain from the target-candidate direction calculator 41, the target-candidate relative-velocity calculator 23 of the signal processor 40 calculates the relative velocity v' of the target candidate from the sampling number k', like that according to above-mentioned Embodiment 2, and outputs the relative velocity v' of the target candidate, the direction θ" of the target candidate, the sampling number k', the sampling number n' and the received video signal $F_V(k, n_T)$ to the target-candidate relative-distance calculator 42.

When receiving the sampling number n' from the target-candidate relative-velocity calculator 23, the target-candidate relative-distance calculator 42 of the signal processor 40 calculates the relative distance $R'_0$ of the target candidate by using the sampling number n', as shown in the following equation (27), and outputs the relative distance $R'_0$ of the target candidate, the relative velocity v' of the target candidate, the direction θ" of the target candidate, the sampling number k', the sampling number n' and the received video signal $F_V(k, n_T)$ to the display device 10.

$$R'_0 = \text{floor}\left(\frac{n'\Delta t}{T_{pls}}\right) \cdot \frac{cT_{pls}}{2} \quad (27)$$

In the equation (27), floor(x) is a floor function of acquiring a maximum integer smaller than or equal to a real number x.

When receiving the relative distance $R'_0$ of the target candidate, the relative velocity v' of the target candidate, the direction θ" of the target candidate, the sampling number k', the sampling number n' and the received video signal $F_V(k, n_T)$ from the target-candidate relative-distance calculator 42 of the signal processor 40, the display device 10 displays the relative distance $R'_0$, the relative velocity v', the direction θ' of the target candidate, the sampling number k', the sampling number n' and the received video signal $F_V(k, n_T)$, as searched results, on the screen thereof.

Figure 14:
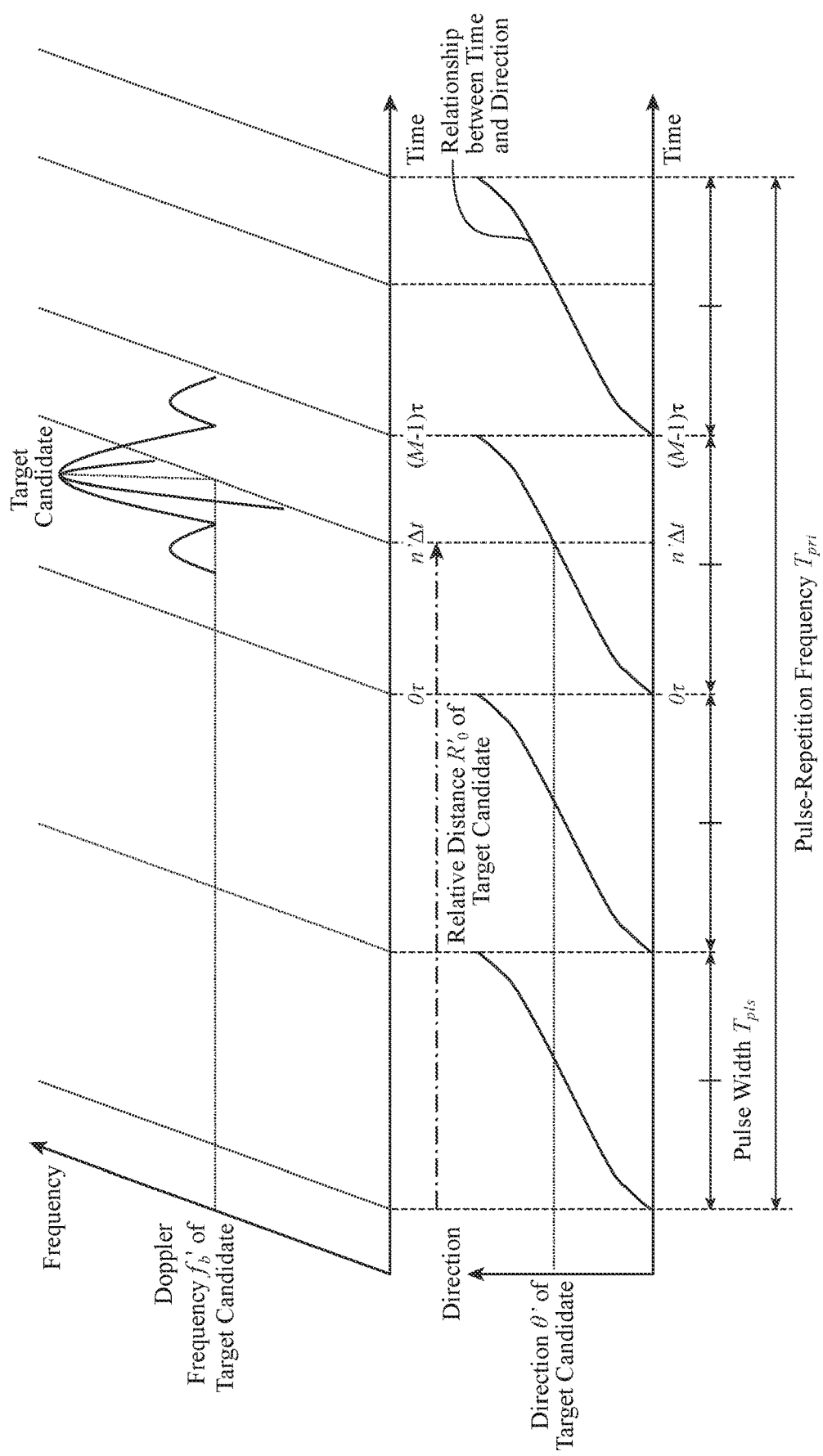
FIG. 14 is an explanatory drawing showing a relative distance of a target candidate at a sampling number n'.

FIG. 14 is an explanatory drawing showing the relative distance of the target candidate at the sampling number n', and the searched results as shown in FIG. 14 are displayed on the display device 10.

As can be seen from the above description, because the radar apparatus according to this Embodiment 3 includes the radio wave receiver 31 corresponding to the radio wave receiver 11 shown in FIG. 9, this embodiment provides an advantage of being able to search for target candidates existing in a plurality of directions with a low amount of arithmetic processing while being able to reduce the hardware scale, like above-mentioned Embodiment 2.

Further, because in the radar apparatus according to this Embodiment 3, the period T of the angular frequency ω' is set as the pulse width $T_{pls}$, the distance ambiguity within the pulse width is eliminated, and the amount of arithmetic processing at a time of calculating the relative distance of the target candidate and the hardware scale can be reduced.

Further, because the radar apparatus according to this Embodiment 3 includes the target-candidate relative-distance calculator 42 for calculating the relative distance $R'_0$ of the target candidate by using the sampling number n', there is provided an advantage of being able to calculate the relative distance $R'_0$ of the target candidate with a low amount of arithmetic processing.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The radar apparatus according to the present invention is suitable for use as a radar apparatus that has to search for target candidates existing in a plurality of directions with a low amount of arithmetic processing.

REFERENCE SIGNS LIST

1: radio wave receiver; 2-1 to 2-M: antenna elements; 3: local oscillator; 4-1 to 4-M: receiver devices; 5: adder; 6: A/D converter (analog-to-digital converter); 7: signal processor; 8: target-candidate detector; 9: target-candidate direction calculator; 10: display device; 11: radio wave receiver; 12: local oscillator; 13: radio wave transmitter; 14: transmitter device; 15: antenna element; 20: signal processor; 21: time-to-frequency domain convertor; 22: target-candidate detector; 23: target-candidate relative-velocity calculator; 31: radio wave receiver; 32: local oscillator; 33: pulse modulator; 40: signal processor; 41: target-candidate direction calculator; 42: target-candidate relative-distance calculator; 51: memory device; and 52: processor.

The invention claimed is:

1. A radar apparatus comprising:
a plurality of antenna elements which receive a pulse-modulated radio wave;
a local oscillator which generates local oscillation signals having different frequencies that differ from one another by an integral multiple of a preset angular frequency, a period of said preset angular frequency being set as a pulse width of said pulse-modulated radio wave;
a plurality of receiver devices to convert frequencies of received signals of said antenna elements using the local oscillation signals generated by said local oscillator;
an adder which adds received signals whose frequencies are converted by said plurality of receiver devices;
an analog-to-digital converter positioned to receive an output signal of said adder, and configured to convert the received output signal into a digital signal, and output said digital signal as a received video signal;
a target-candidate detector to detect a candidate for a target which is an observation object in accordance with signal power of the received video signal outputted from said analog-to-digital converter, said target-candidate detector being configured to output a sampling number corresponding to the detected candidate for a target; and
a target-candidate direction calculator to calculate a direction pointing to the candidate for a target from a reception time of a radio wave from which the candidate for a target is detected by said target-candidate detector, said target-candidate direction calculator being configured to calculate a direction pointing to the detected candidate for a target by using the sampling number corresponding to the detected candidate for a target.

2. The radar apparatus according to claim 1, further comprising:
a pulse modulator which pulse-modulates a radio wave; and
a radio wave transmitter which radiates the radio wave pulse-modulated by said pulse modulator, into space, wherein
said antenna elements receive the pulse-modulated radio wave which is reflected by said target and then returns thereto after being radiated by said radio wave transmitter.

3. The radar apparatus according to claim 1, wherein said preset angular frequency is set to a value which is acquired by dividing 360 degrees by a pulse width of said pulse-modulated radio wave.

4. The radar apparatus according to claim 1, wherein, when adding the received signals whose frequencies are converted by said plurality of receiver devices, said adder performs a window function process of weighting the received signals and then adding the weighted received signals, thereby reducing side lobes of an antenna pattern.

5. The radar apparatus according to claim 1, further comprising a time-to-frequency domain convertor which converts the received video signal outputted from said analog-to-digital converter, into a frequency domain signal, wherein
said target-candidate detector detects the candidate for a target which is an observation object, in accordance with signal power of the frequency domain signal obtained by the conversion performed by said time-to-frequency domain convertor.

6. The radar apparatus according to claim 5, further comprising a target-candidate relative-velocity calculator to calculate a relative velocity of the candidate for a target from a frequency at which the candidate for a target is detected by said target-candidate detector.

7. The radar apparatus according to claim 1, further comprising a target-candidate relative-distance calculator to calculate a relative distance of the candidate for a target from a reception time of a radio wave from which the candidate for a target is detected by said target-candidate detector.

\* \* \* \* \*